United States Patent [19]

Fukutomi et al.

[11] Patent Number: 4,796,943

[45] Date of Patent: Jan. 10, 1989

[54] CONVERTIBLE VEHICLE BODY STRUCTURE HAVING A REAR SEAT

[75] Inventors: Hisao Fukutomi; Takanori Tuchiya; Takeshi Yamamoto; Takeshi Konishi; Iseo Hamasaki, all of Hiroshima, Japan

[73] Assignee: Mazda Motor Corporation, Hiroshima, Japan

[21] Appl. No.: 932,949

[22] Filed: Nov. 20, 1986

[30] Foreign Application Priority Data

Nov. 20, 1985 [JP] Japan ................................ 60-260833
Nov. 20, 1985 [JP] Japan ................................ 60-260835
Apr. 30, 1986 [JP] Japan ................................ 61-99828

[51] Int. Cl.⁴ .............................................. B60J 7/14
[52] U.S. Cl. .................................. 296/65.1; 296/107; 296/117
[58] Field of Search ............... 296/107, 108, 116, 117, 296/186, 146, 65 R, 112, 115

[56] References Cited

U.S. PATENT DOCUMENTS

| | | | |
|---|---|---|---|
| 2,267,471 | 12/1941 | Keller | 296/117 |
| 2,596,355 | 5/1952 | Ackermans | 296/117 X |
| 2,704,226 | 3/1955 | Orr | 296/117 |
| 2,750,227 | 6/1956 | Orr | 296/65 R |
| 2,762,648 | 9/1956 | Huzzard | 296/117 X |
| 2,795,455 | 6/1957 | Earl | 296/146 X |
| 2,939,742 | 6/1960 | Dardarian et al. | 296/107 |
| 4,557,502 | 12/1985 | Scaduto et al. | 280/756 |

FOREIGN PATENT DOCUMENTS

| | | | |
|---|---|---|---|
| 1405868 | 1/1969 | Fed. Rep. of Germany | 296/65 R |
| 1530943 | 9/1969 | Fed. Rep. of Germany | 296/65 R |
| 1049026 | 12/1953 | France | 296/107 |
| 59-48230 | 3/1984 | Japan | |
| 59-133375 | 9/1984 | Japan | |
| 464270 | 4/1937 | United Kingdom | 296/107 |
| 2086316 | 5/1982 | United Kingdom | |

*Primary Examiner*—Dennis H. Pedder
*Attorney, Agent, or Firm*—Fleit, Jacobson, Cohn & Price

[57] ABSTRACT

A convertible vehicle body has front rear retractable roof panels which fit behind a rear seat back and a power system for retracting the roof panels, the power system also providing a mechanism for forwardly inclining the rear seat when the roof panels are to be retracted. The vehicle body may also include a power-operated rear quarter window and the power system for retracting the same in sequence with the roof panels.

4 Claims, 17 Drawing Sheets

CONVERTIBLE VEHICLE BODY STRUCTURE HAVING A REAR SEAT

BACKGROUND OF THE INVENTION

1. Field of the Invention

The present invention relates to a vehicle body structure, and more particularly to a convertible type vehicle body structure wherein the vehicle body top can be opened as desired.

2. Description of the Prior Art

The British Patent No. 2,086,316 discloses a convertible type vehicle structure having an inverted U-shaped swingable pillar which is swingable between an erected position and a retracted position. In the retracted position of the swingable pillar, a rigid roof panel is removably attached to extend between the front header of the front windshield and the swingable pillar. A foldable hood is provided between the swingable pillar and the rear body structure to cover the rear portion of the vehicle body. For opening the vehicle body top, the rigid roof panel is at first removed and the swingable pillar is then swung rearwardly simultaneously folding the hood.

The convertible vehicle body structure as proposed by the British patent is however inconvenient to handle because the rigid roof panel must at first be removed and stored in a suitable place such as the trunk room, and thereafter the swingable pillar must be moved to the retracted position. It should further be noted that the hood covering the rear body portion does not have an attractive appearance and flutters in a high speed operation under wind pressure producing uncomfortable noises.

SUMMARY OF THE INVENTION

It is an object of the present invention to provide a convertible type vehicle body structure having an attractive appearance and which is convenient to handle.

Another object of the present invention is to provide a convertible type vehicle body structure in which the roof panel can be retracted together with the swingable pillar.

A further object of the present invention is to provide a convertible type vehicle body structure having rigid roof panels covering the top portion as well as the rear portion which are able to be retracted simultaneously with the swingable pillar.

Still a further object of the present invention is to provide a roof structure for a convertible type vehicle body structure which has a swingable pillar structure movable between an erected position and a retracted position and a rigid rear roof panel covering the rear roof portion between the erected pillar structure and the rear body section.

Yet a further object of the present invention is to provide a convertible vehicle body structure having a swingable pillar structure, a rigid front roof panel covering the body top between the front windshield and the pillar structure and a rigid rear roof panel covering the body rear portion between the pillar structure and the rear body section, the roof panels being retractable in fore-and-aft relation with each other.

A further object of the present invention is to provide a convertible vehicle body structure having front and rear seats, wherein the seat backs of the rear seats are inclined forwardly when the roof panel is being moved to the retracted position.

According to the present invention, the above and other objects can be accomplished by a convertible vehicle body structure including body means which includes front windshield means having an upper edge portion, a rear body section having an upper edge defining a belt line and front and rear seat means respectively having seat back means, substantially rigid front roof panels means for covering a front portion of a passenger compartment, substantially rigid rear roof panel means for covering a rear portion of the passenger compartment, said front roof panel means being supported by said rear body section for swinging movements between an erected portion wherein the front roof panel means covers the front portion of the passenger compartment and a retracted position wherein the front roof panel is retracted in the rear body section, said rear roof panel means being supported by said rear body section for swinging movements between an erected position wherein the rear roof panel means covers the rear portion of the passenger compartment and a retracted position wherein the rear roof panel means is retracted in the rear body structure, said rear roof panel means being located in a fore-and-aft relationship with respect to the front roof panel means when both the front and rear roof panel means are retracted, first means for actuating the front and rear roof panel means between the erected and retracted positions, second means for inclining the seat back means forwardly, control means for operating the second means when the first means is operated to actuate the front and rear roof panel means to the retracted positions.

According to a further feature of the present invention, means is provided for moving the seat back means of the rear seat means to a normal upright position when the front and rear roof panel means are moved to the retracted positions.

The above and other objects and features of the present invention will become apparent from the following descriptions of preferred embodiments taking reference to the accompanying drawings.

DESCRIPTION OF THE PREFERRED EMBODIMENTS

Figure 1:
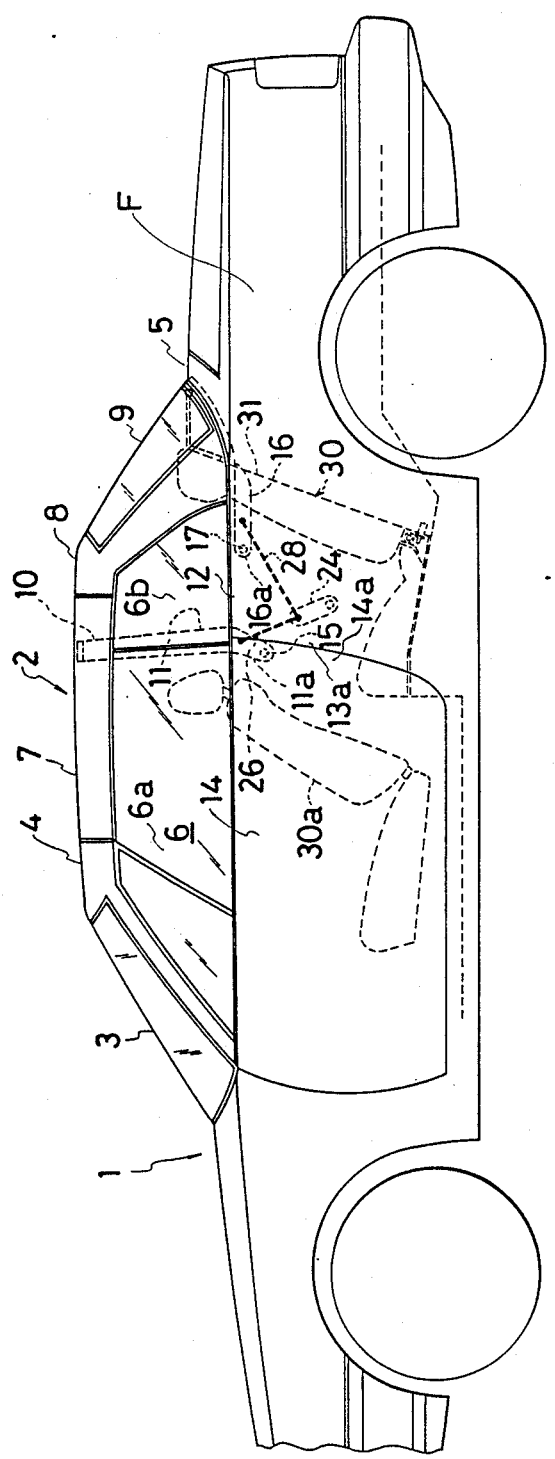
FIG. 1 is a side view of a convertible type vehicle in accordance with one embodiment of the present invention.
Figure 6:
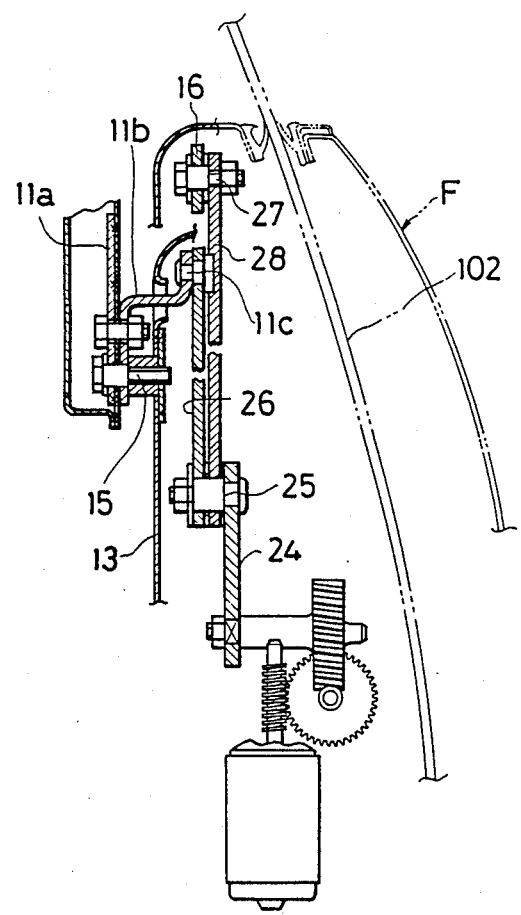
FIG. 6 is a sectional view taken along the line B—B in FIG. 5.
Figure 7:
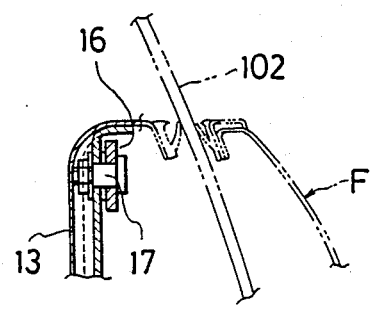
FIG. 7 is a sectional view taken along the line A—A in FIG. 5.

Referring to the drawings, particularly to FIG. 1, there is shown a convertible type vehicle body 1 including a front windshield 3 having an upper edge portion or front header 4. The vehicle body 1 further includes a rear body section 5 which has a pair of rear fender panel assemblies F having an upper edge 12 defining a vehicle belt line. As shown in FIGS. 6 and 7, the rear fender panel assembly F is constituted by an inner panel 13 and an outer panel 13b. Referring to FIG. 1, it will be noted that the rear fender panel assembly F has a front edge portion 13a which is of a stepped configuration defining a rear edge of a side door opening. In the side door opening, there is provided a side door 14 having a rear edge portion 14a of a cross-section which is complimentary to the cross-section of the front edge portion 13a of the rear fender panel F. There is provided a roof structure 2 which includes a front roof section 7 and a rear roof section 8 having a transparent rear windshield glass 9.

Figure 2:
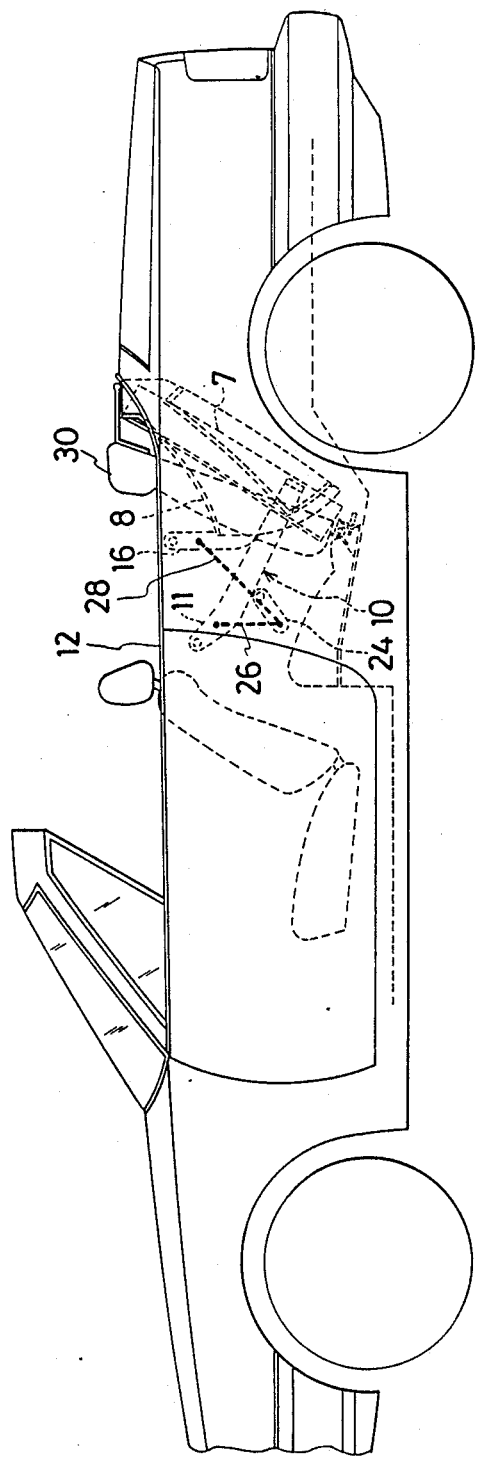
FIG. 2 is a side view of the vehicle shown in FIG. 1 but shown in an open-top condition.
Figure 11:
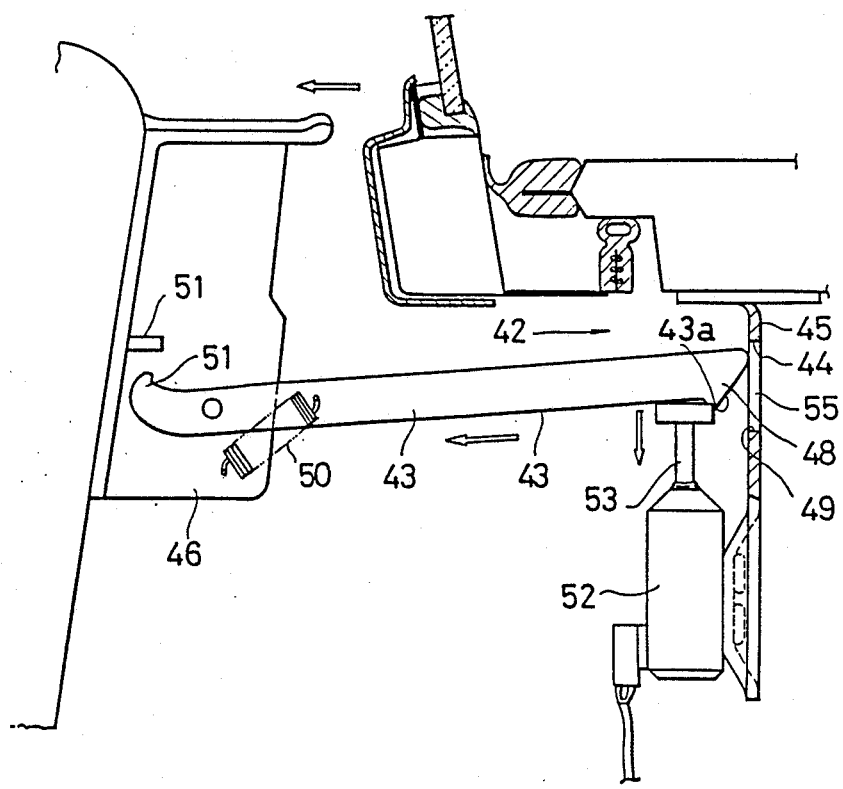
FIG. 11 is another view showing the operation of the rear seat back inclining mechanism.

The front roof section 7 is separated from the rear roof section 8 and supported by a swingable pillar structure 10 of a substantially inverted U-shaped configuration. The pillar structure 10 has a pair of leg portions 11 extending downward from the intermediate portion which is secured to the front roof portion 7. The leg portion 11 has a lower end 11a which is slightly forwardly bent and pivotably attached to the front edge portion 13a of the rear fender panel assembly F by means of a shaft 15 as shown in FIG. 11. It will be noted that the pillar structure 10 may not necessarily be of an inverted U-shaped configuration but it may be substituted by a pair of supporting legs. The pillar structure 10 is swingable between an upright position as shown in FIG. 1 and a retracted position as shown in FIG. 2. In the upright position, the pillar structure 10 stands substantially upright and supports the front roof panel 7 in a positon wherein the roof panel 7 covers a front part 6a of a passenger compartment 6. In the retracted position, the pillar structure 10 is retracted into the rear body section until the front roof panel 7 is housed in the rear body section.

Figure 3:
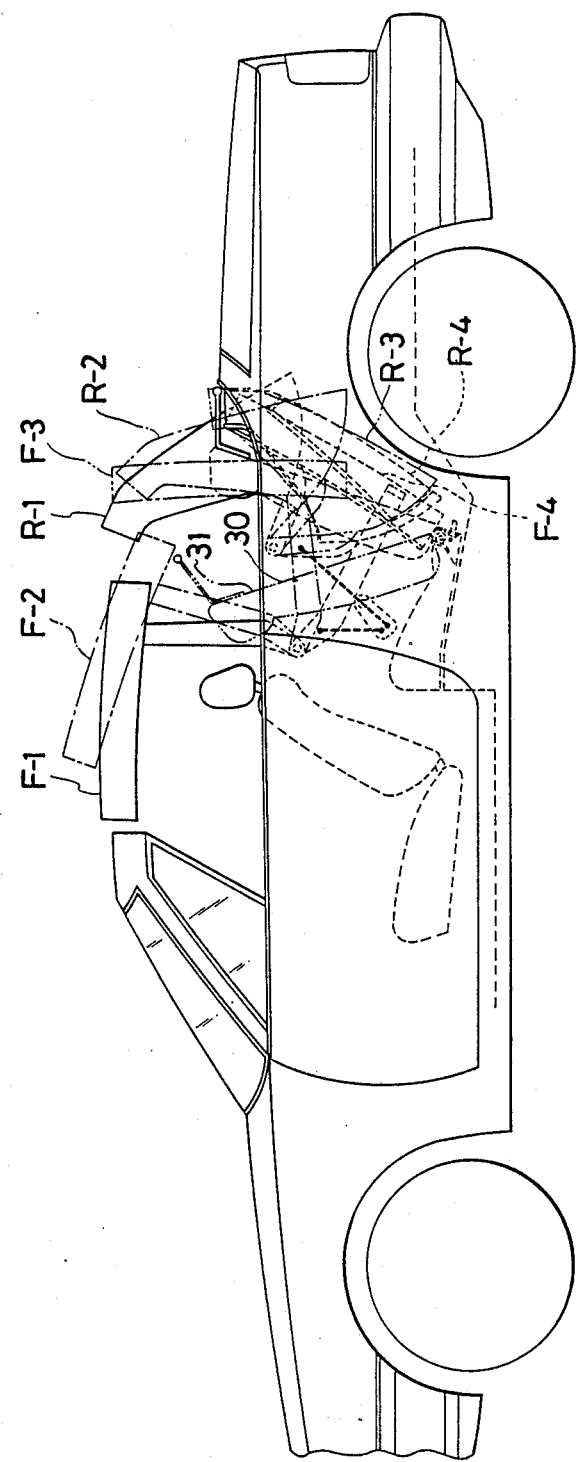
FIG. 3 is a side view showing the movements between the open and closed conditions.

As shown in FIG. 1, the rear roof panel 8 is provided at a lower portion of each side with a forwardly extending attachment arm 16 having a forward end portion 16a pivotally attached to the inner panel 13 of the rear fender panel assembly F by means of a pivot pin 17. The rear roof panel 8 is therefore swingable about the pivot pin 17 between an erected position as shown in FIG. 1 and a retracted position as shown in FIG. 2. In the erected position, the rear roof panel 8 covers a rear portion 6b of the passenger compartment 6 and provides a continuous roof structure together with the front roof panel 7. In the retracted position, the rear roof panel 8 is retracted in the rear body section. It wil be noted that in the retracted positions, the front roof panel 7 and the rear roof panel 8 are juxtaposed in a fore-and-aft relationship with each other in the rear body section so that the passenger comaprtment 6 is completely opened. FIG. 3 shows sequential steps for moving the roof panels 7 and 8 from the erected positions to the retracted positions.

Figure 5:
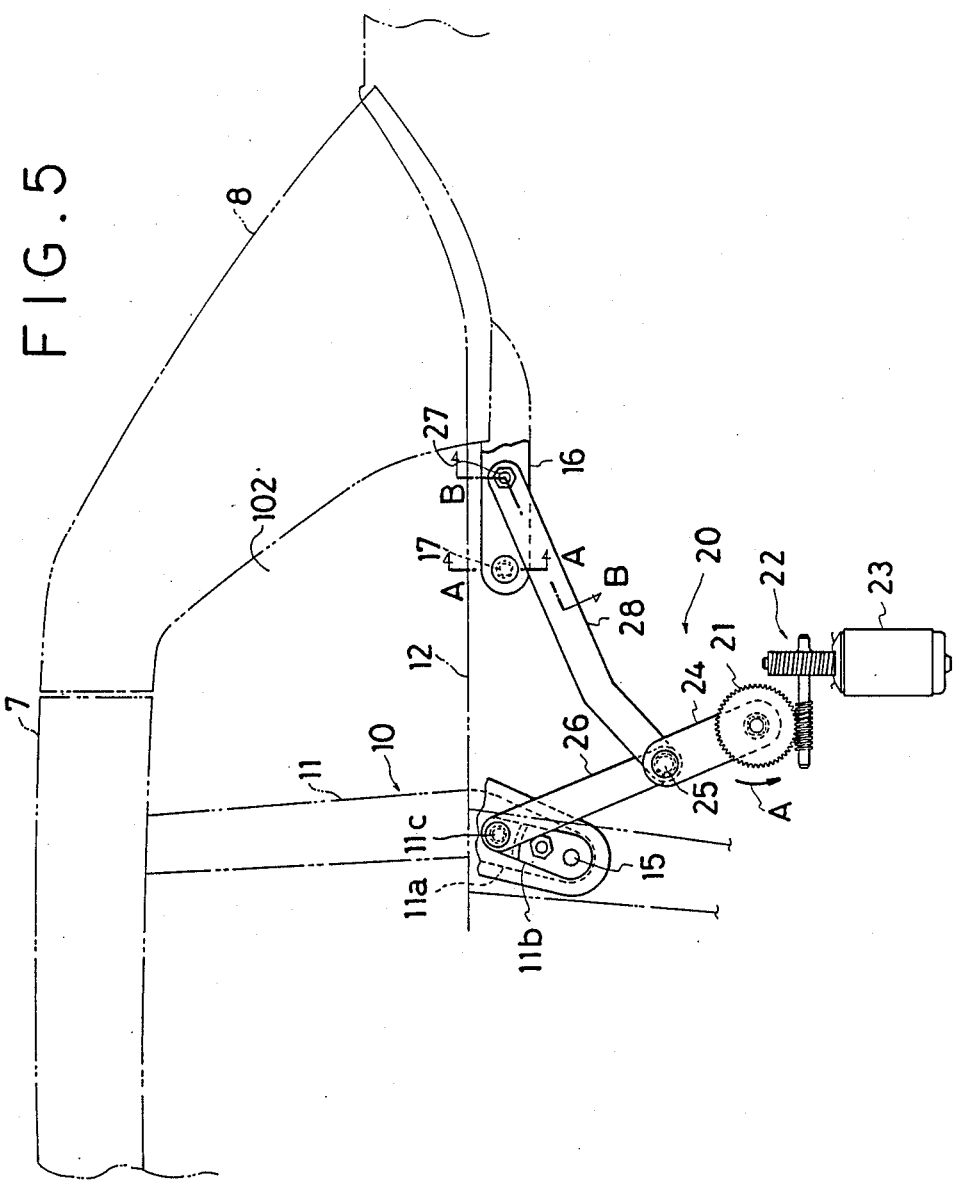
FIG. 5 is a side view showing essential parts of the roof actuating mechanism.

Referring to FIG. 5, there is shown a driving mechanism 20 for driving the roof panels 7 and 8 between the erected positions and the retracted positions. The driving mechanism 20 includes a driving gear 21 which is mounted on the rear fender panel assembly F and driven by an electric motor 23 through a worm gear device 22. The driving gear 21 is provided with a driving link arm 24 which is secured to the gear 21 at one end. The other end of the link arm 24 is pivotably connected through a pivot pin 25 with first link 26 and a second link 28.

An arm 11b is secured at one end to the lower end portion 11a of the legs 11 of the pillar structure 10. The other end of the arm 11b is pivotably connected through a pivot pin 11c with a free end of the link arm 26. The link arm 28 is pivotably connected at the free end with the arm 16 on the rear roof panel 8 through a pivot pin 27 at a position rearward the pivot pin 17. As shown in FIG. 6, the driving mechanism 20 is located between the inner panel 13 and the outer panel 13b of the rear fender panel assembly F and mounted on the inner panel 13. The arm 11b which is attached to the leg 11 of the pillar structure 10 extends through a slot formed in the inner panel 13.

Figure 4:
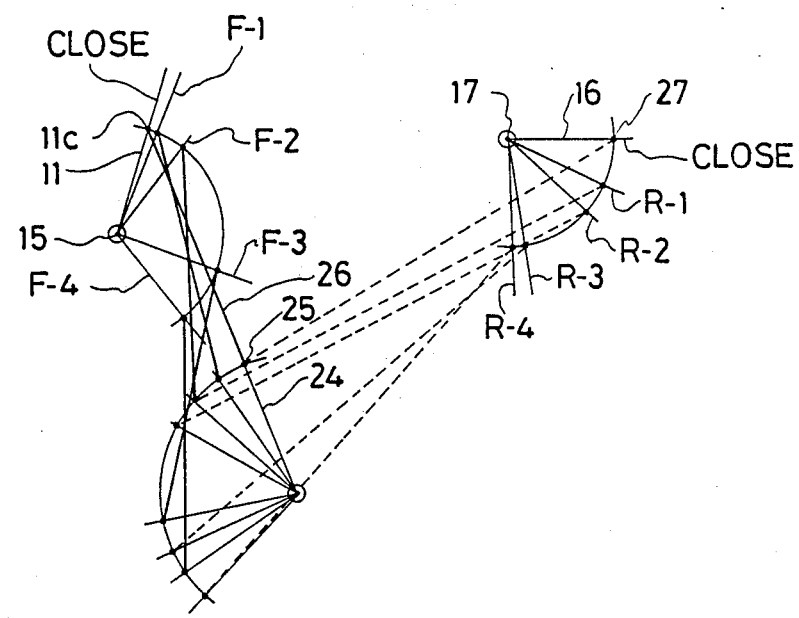
FIG. 4 is a side view showing the operation of the link mechanism.

In the erected position of the front roof panel 7, the link arms 24 and 26 align in a line as shown in FIG. 5 so that the pillar structure 10 is forced to the erected portion. In the erected position of the rear roof panel 8, the link arm 28 extends substantially perpendicularly to the link arm 24. The link arm further extends so that it makes a small angle with the arm 16. For retracting the roof panels, the motor 23 is actuated to rotate the link arm 24 in the direction as shown by an arrow A. Due to the geometrical arrangement, the swingable movement of the pillar structure 10 is relatively small in the intial stage of the rotation of the link arm 24. The link arm 28 is however moved relatively rapidly so that the rear roof panel starts to be retracted more rapidly than the front roof panel 7. The positions of the roof panels 7 and 8 in the initial stage of the retracting movements are shown by F-1 and R-1 in FIG. 3. Thereafter, the roof panels 7 and 8 are moved to positions F-2 and R-2 and to positions F-3 and R-3. The completely retracted positions are shown by F-4 and R-4. FIG. 4 shows the operations of the link arms.

Figure 8:
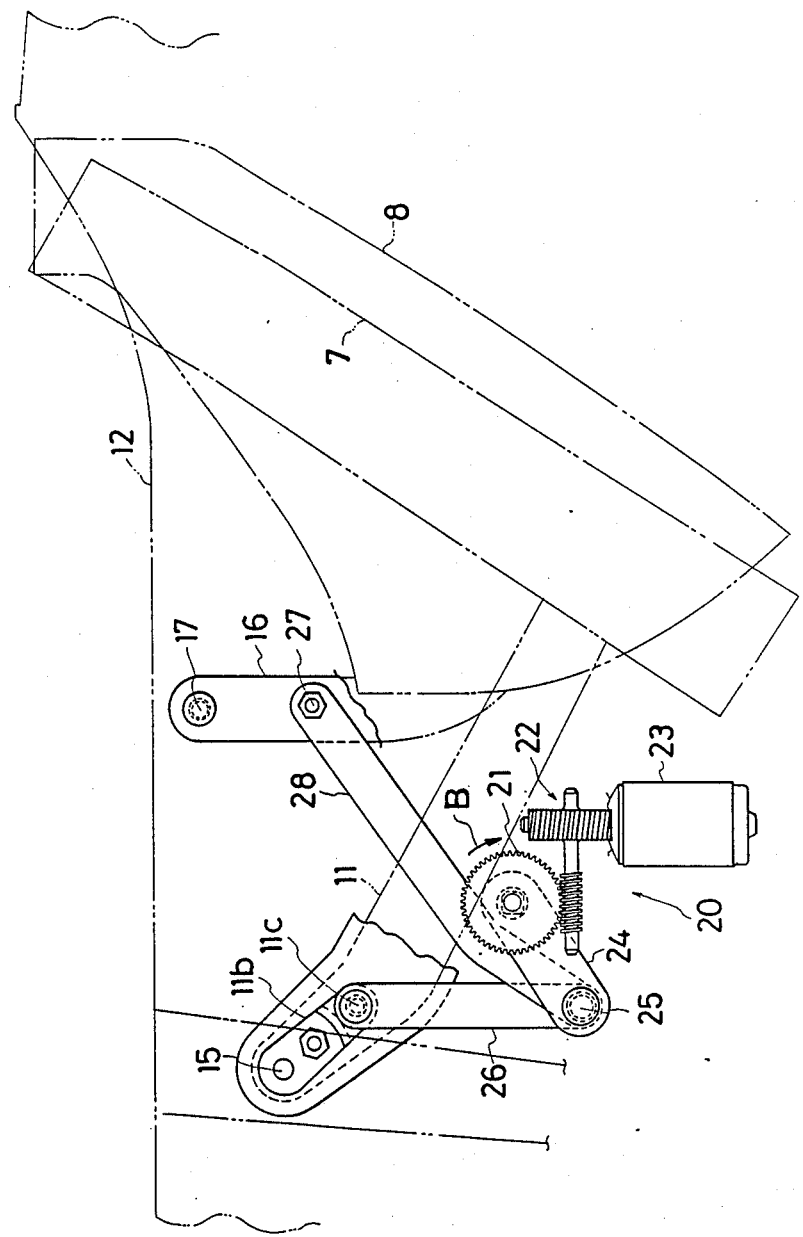
FIG. 8 is a fragmentary illustration of the roof actuating mechanism.

In the retracted position, the link arm 26 makes a relatively large angle with the driving arm 24 whereas the link arm 28 makes a small angle with the driving arm 24 as shown in FIG. 8. It will therefore be understood that when the arm 24 is rotated in the direction shown by an arrow B in FIG. 8 to move the roof panels to the extended positions, the arm 28 is moved relatively slowly in the initial stage of the movement as compared with the link arm 26. Therefore, the front roof panel 7 is moved faster than the rear roof panel 8. In case where rear passenger seats 30 are provided as in the illustrated embodiment, it would be preferable to fold the seat backs 31 forwardly as shown in FIG. 3.

It will be noted that as shown in FIGS. 1, 6 and 7, a rear quarter glass panel 102 is provided in the rear fender panel assembly F. The rear quarter glass panel 102 is movable between the extended position as shown in FIG. 1 and a retracted position wherein it is completely retrated into the rear fender panel assembly F. The side door assembly 14 further has a door glass 100 which is also retractable into the door panel. Suitable glass actuating mechanisms may be provided in the rear fender panel assembly F and the side door assembly 14.

Figure 9:
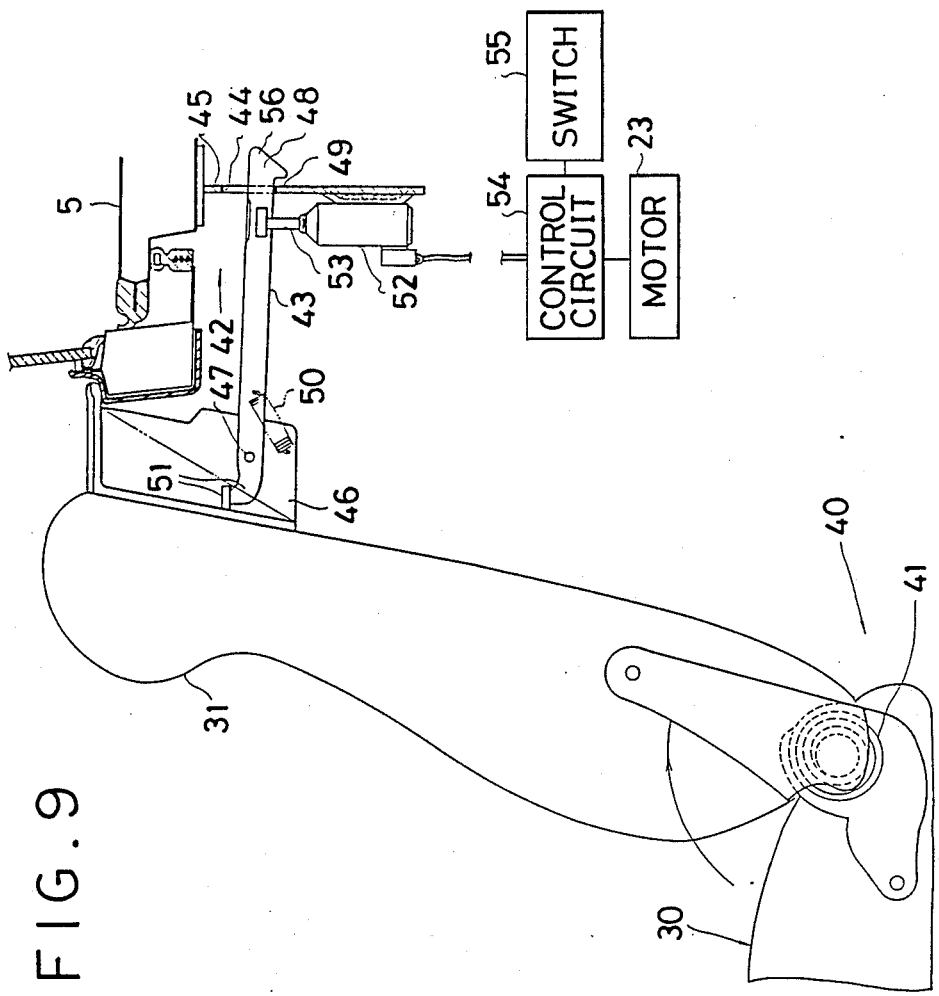
FIG. 9 is a side view of a rear seat back inclining mechanism.

Referring to FIG. 1, it will be noted that the vehicle body has a rear seat 30 as well as front seats 30a. The rear seat has a seat back 31 which may disturb the movements of the roof panels 7 and 8 when they are moved between the erected and retracted positions. As shown in FIG. 9, the vehicle body structure shown therein includes a mechanism 40 for forwardly inclining the seat back 31 when the roof panels 7 and 8 are moved between the erected and retracted positions.

In FIG. 9, it will be noted that the mechanism 40 includes a coil spring 41 which biases the seat back 31 forwardly. Behind the seat back 31, there is provided a locking mechanism 42 for locking the seat back 31 in the normal upright position as shown in FIG. 9. The mechanism 42 includes a locking lever 43 and a locking plate 45 having a hole 44. The lock lever 43 is pivotably mounted by means of a pivot pin 47 on a bracket 46 which is provided on the back side of the seat back 31 for swingable movements in a vertical plane. The locking lever 43 is formed at the rear end portion with a downwardly directed pawl 48.

As shown in FIG. 9, the locking plate 45 extends from an upper panel of the rear body section 5 downwardly and the hole 44 is located to receive the locking lever 43. The seat back 31 is normally locked in the upright position by the pawl 48 engaged with the lower edge 49 of the hole 44 in the locking plate 45. To ensure that the pawl 48 is engaged with the edge 49 of the hole 44, a tension spring 50 is provided to bias the lever 43 downwardly. On the bracket 46, there is provided a stopper 51 which is adapted to be engaged with the front end of the locking lever 43 when the lever 43 is in the engaged position.

Figure 10:
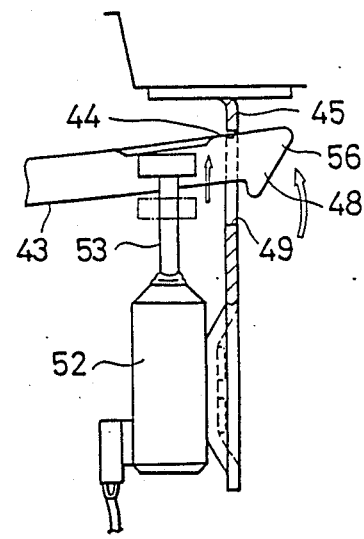
FIG. 10 is a fragmentary side view showing the mechanism for inclining the seat back of the rear seat.

Beneath the rear end portion of the locking lever 43, there is provided a release solenoid 52 for releasing the pawl 48 of the lever 43 from the engagement with the edge 49 of the hole 44. The solenoid 52 has an armature 53 extending upwardly. When the solenoid 52 is energized, the armature 53 is projected upward to push the rear end portion of the lever 43 upwardly as shown in FIG. 10 to thereby release the pawl 48 from the edge 49 of the hole 44. As soon as the pawl 48 is disengaged from the hole 44, the seat back 31 is forced to incline forwardly under the bias of the spring 41.

There is provided a control circuit 54 which is connected with the roof actuating motor 23 and the release solenoid 52. A manual switch 55 is provided for operating the control circuit 54. When the switch 55 is actuated to move the roof panels 7 and 8 in either direction, the solenoid is at first energized so that the pawl 48 on the locking lever 43 is disengaged from the edge 49 of the hole 44 in the locking plate 45 and thereafter the roof panels 7 and 8 are moved. Thus, there is provided a sufficient space for allowing the roof panels 7 and 8 to pass in the movements between the erected and retracted positions. When the roof panels are moved to either of the erected and retracted positions, the solenoid 52 is deenergized and seat back may be returned to the upright position manually. Since the lever 43 is formed at the rear end with a sloped edge 56, the rear end portion of the lever 43 can be readily slipped into the hole 44 in the locking plate 45.

Figure 12:
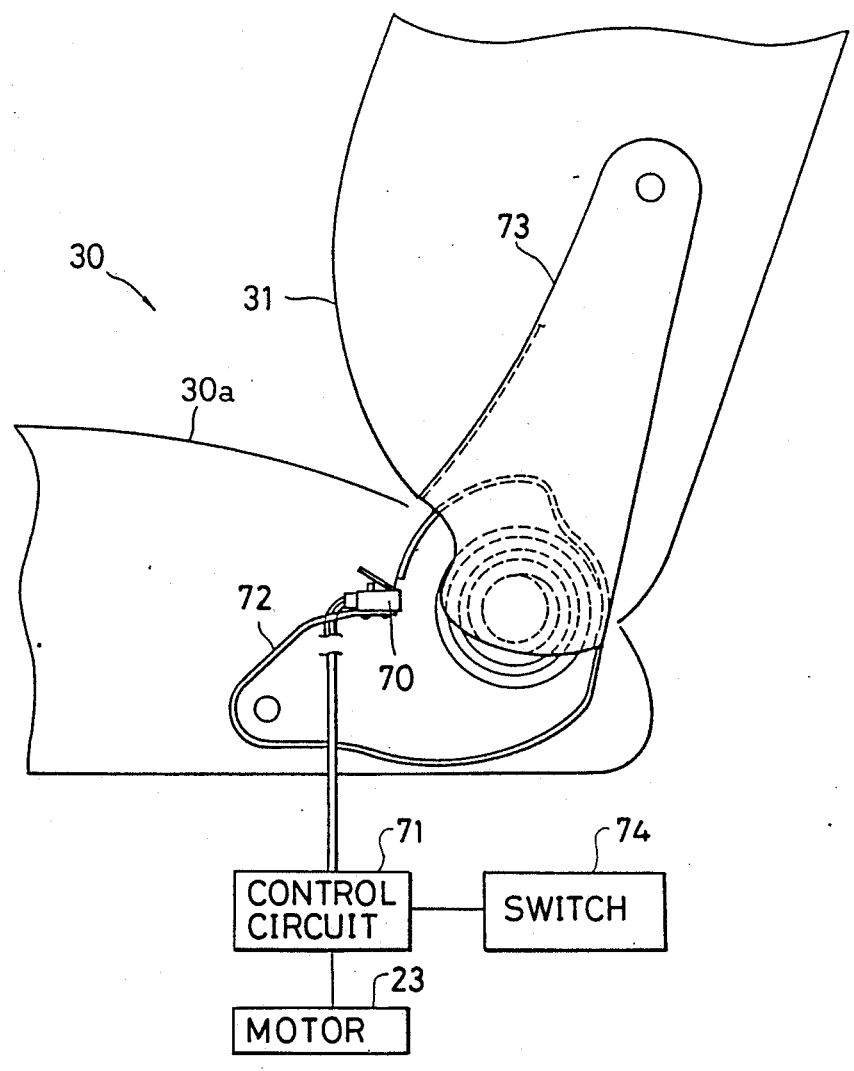
FIG. 12 is a frangmentary side view showing another example of the rear seat back inclining mechanism.
Figure 13:
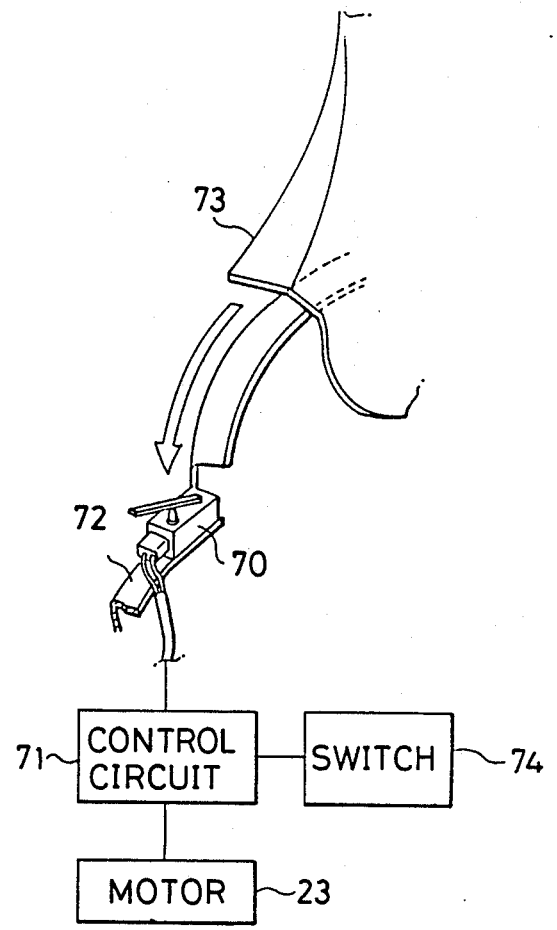
FIG. 13 is a perspective view showing the arrangement of the seat back position detecting switch.
Figure 14:
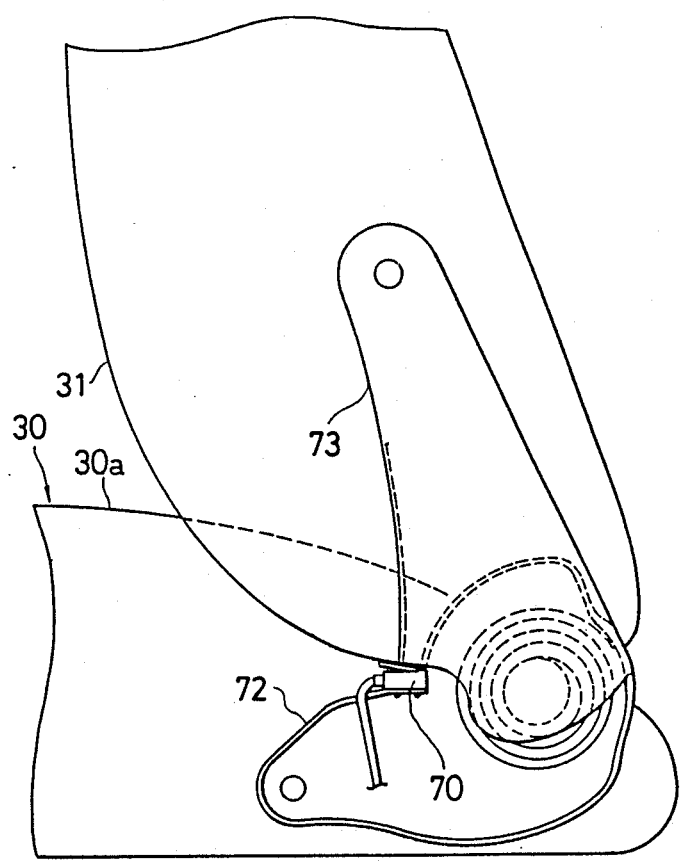
FIG. 14 is a fragmentary side view showing the rear seat back in the forwardly inclined position.
Figure 15:
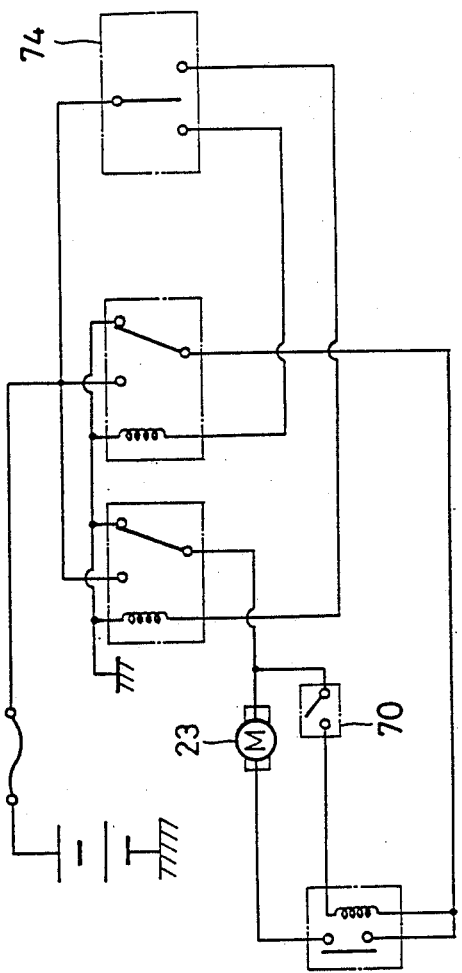
FIG. 15 is a diagram showing the electric circuit for controlling the operation of the rear seat back inclining mechanism.

Referring to FIG. 12, it will be noted that the rear seat 30 has a seat cushion 30a on which a seat back position switch 70 is provided. More specifically, the seat cushion 30a has a bracket 72 supporting a bracket 73 on the seat back 31 and the switch 70 is mounted on the bracket 72 on the seat cushion 30a. As shown in FIGS. 13 and 14, the switch 70 is located so that it is actuated by the bracket 73 on the seat back 31 when the seat back 31 is forwardly inclined to a predetermined position. The switch 70 is connected with a control circuit 71 which is operated by a manual switch 74 and produces an output to actuate the motor 23. As shown in FIG. 15, the switch 40 is located in the energizing circuit of the motor 23 so that the motor 23 can be operated only when the seat back 31 is forwardly inclined.

Figure 16:
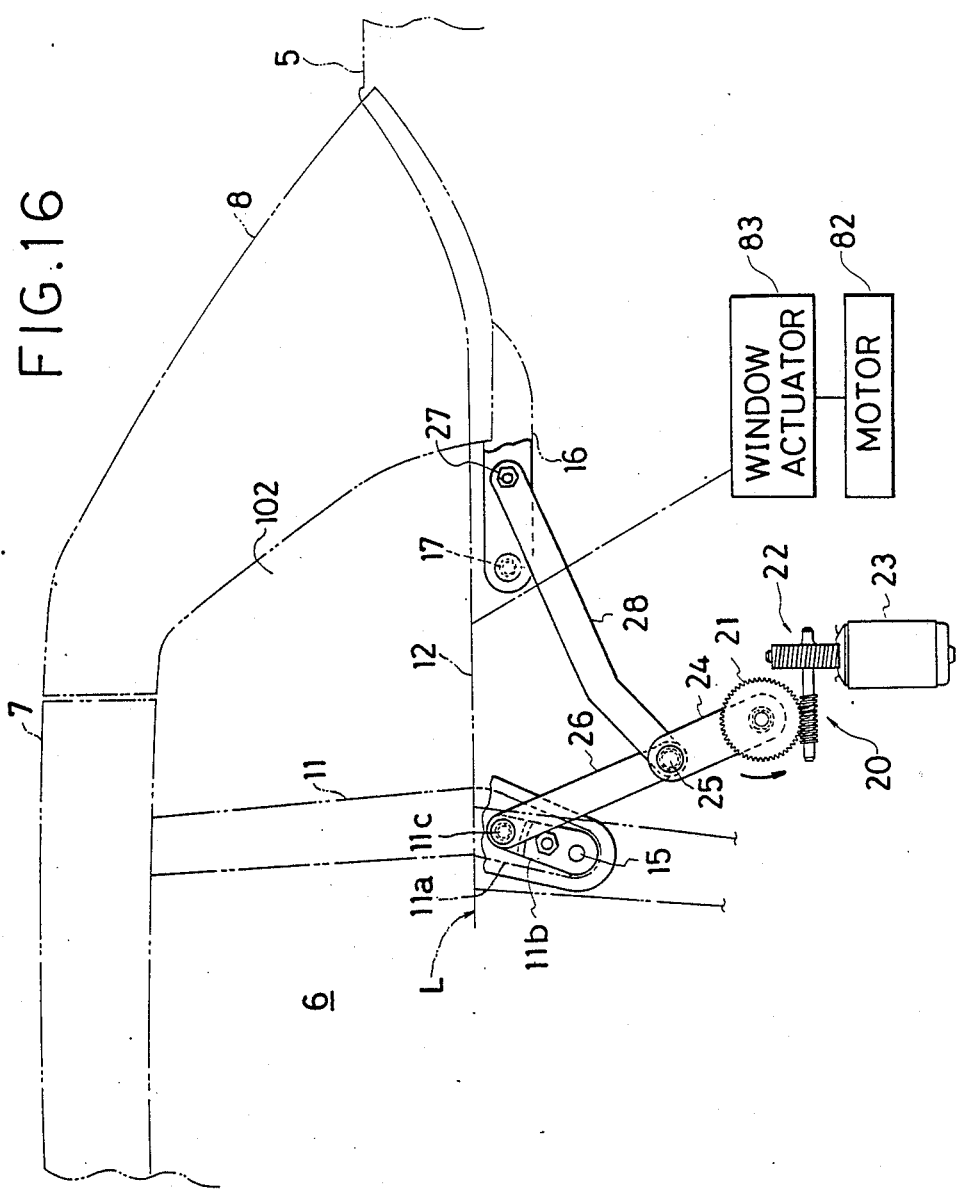
FIG. 16 is a fragmentary side view showing another embodiment of the present invention.
Figure 17:
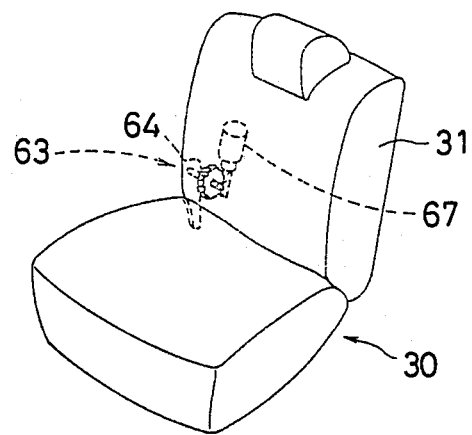
FIG. 17 is a perspective view of the rear seat in the embodiment shown in FIG. 16.
Figure 18:
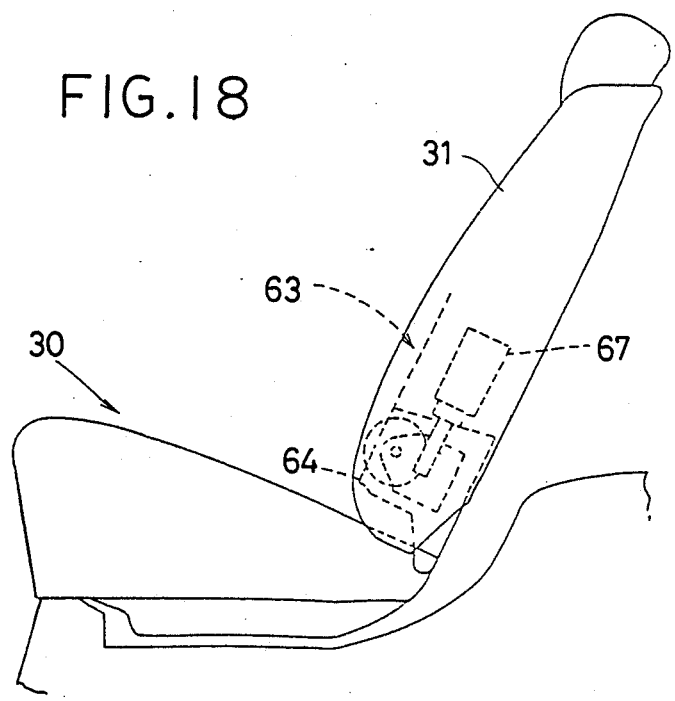
FIG. 18 is a side view of the rear seat.
Figure 19:
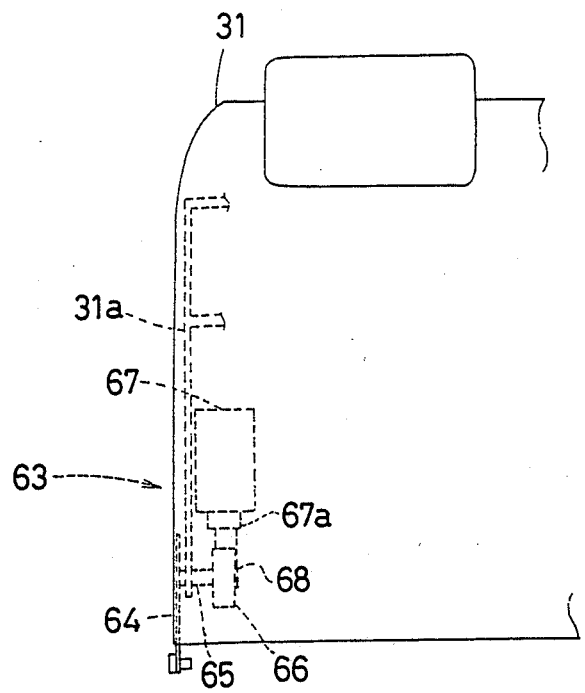
FIG. 19 is a rear view of the seat.
Figure 20:
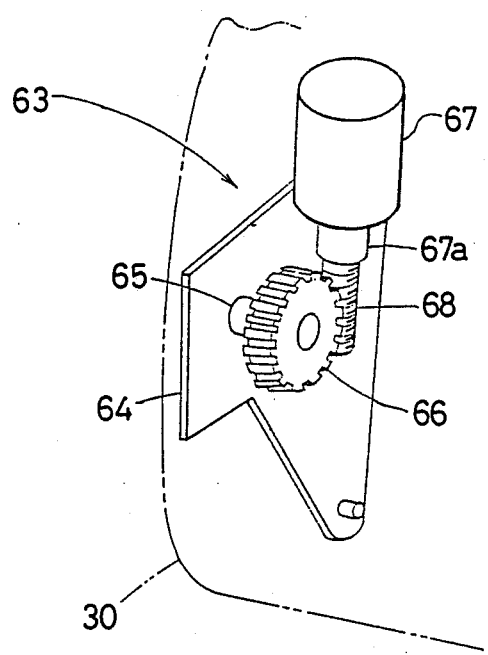
FIG. 20 is a perspective view of the rear seat back actuating mechanism.

Referring now to FIG. 16, the embodiment shown therein includes a window actuating motor 82 for driving the rear quarter glass panel 102 through a window driving mechanism 83. In FIGS. 17 through 20, it will be noted that a seat back driving mechanism 63 is provided in the rear seat 30. The mechanism 63 includes a bracket 64 secured at each side to the rear body section 5. The seat back 31 is rotatably supported by a shaft 65 secured to the bracket 64. A worm wheel 66 is secured to the shaft 65 and engaged with a worm 68 formed on an output shaft 67a of a motor 67 which is mounted on a seat back frame 31a in the seat back 31. It will be understood that an actuation of the motor 67 causes a rotation of the shaft 67a with respect to the worm wheel 66 so that the seat back inclination angle can be changed.

Figure 21:
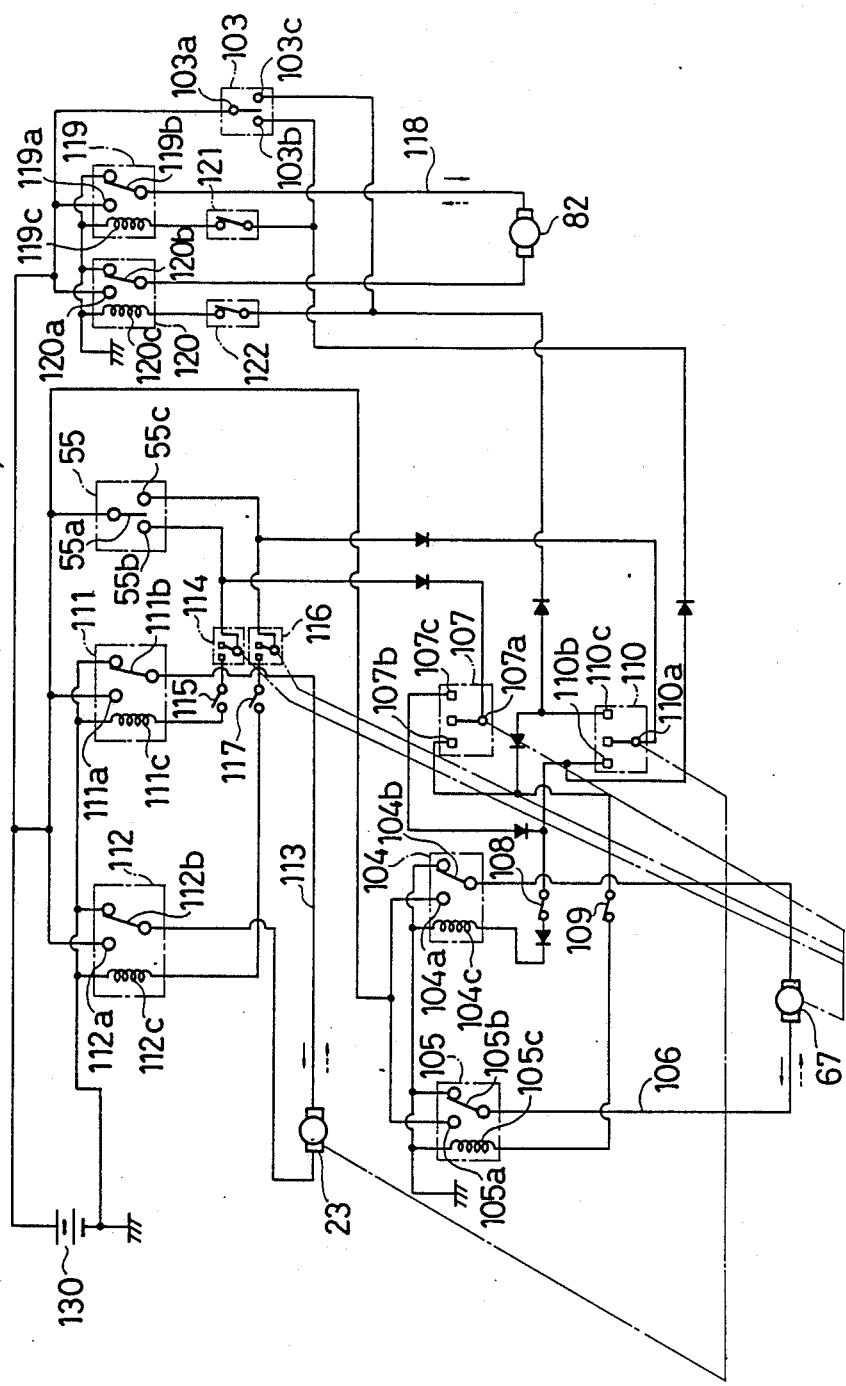
FIG. 21 is a circuit diagram for the rear seat back actuating mechanism.

Referring to FIG. 21, there is shown a control circuit 101 for controlling the operations of the motors 23, 67 and 82. The control circuit 101 includes a manual switch 55 having a movable contact 55a and stationary contacts 55b and 55c. The movable contact 55a is alternately moved into engagement with the contacts 55b and 55c respectively for opening and closing the roof. There is a power window switch 103 for operating the rear quarter window 102 irrespective of the operation of the roof structure. The switch 103 includes a movable contact 103a and stationary contacts 103b and 103c. The movable contact 103a is alternately brought into engagement with the contacts 103b and 103c respectively for opening the window and for closing the window.

The movable contact 55a of the roof actuating switch 55 is connected with an electric power source 130. In parallel with the switch 55, there are provided a pair of relay switches 104 and 105 which have contacts 104a and 105a connected with the power source 130. The relays 104 and 105 have movable contacts 104b and 105b, respectively, which are connected through lines 106 with the seat back actuating motor 67. The roof retracting contact 55c of the roof switch 55 is connected with a first roof position detecting switch 107 at a movable contact 107a. The switch 107 has stationary switch contacts 107b and 107c which are adapted to be alternately engaged with the movable contact 107a. In the retracted position of the roof structure, the movable contact 107a is engaged with the contact 107b, whereas when the roof structure is in the erected position, the movable contact 107a is engaged with the contact 107c. The contact 107c is grounded through a normally closed type seat back position switch 108 and a relay solenoid coil 104c of the relay 104. The switch 108 is normally closed but opened when the seat back 31 is in the forwardly inclined position. The contact 107b is grounded through a seat back position switch 109 and a relay solenoid coil 105c of the relay 105. The switch 109 is normally closed but opened when the seat back 31 is in the upright position. It will therefore be understood that in the erected position of the roof structure, the movable contact 107a of the roof position switch 107 is engaged with the contact 107c so that, when the roof actuating switch 55 is operated to open the roof structure, the relay 104 is energized to make the movable contact 104b of the relay 104 engage with the contact 104a. Thus, the motor 67 is supplied with current in the direction as shown by a solid arrow to make the seat back 31 incline forwardly. As soon as the seat back 31 reaches the forwardly inclined position, the switch 108 is opened so that the movement of the seat back 31 is stopped.

The contact 55c of the roof switch 55 is connected with a second roof position detecting switch 110 at a movable contact 110a. The switch 110 has stationary contacts 110b and 110c and the movable contact 110a is alternately brought into engagement with the contacts 110b and 110c, respectively when the roof structure is in the retracted position and the erected position. The contact 110b of the switch 110 is grounded through the seat back position switch 108 and the solenoid coil 104c. The contact 110c is grounded through the seat back position switch 109 and the solenoid coil 105c. It will therefore be understood that, in the retracted position of the roof structure, an actuation of the roof switch 55 to make the movable contact 55a engage with the contact 55c will cause the relay 104 to be energized so that the seat back 31 is moved to incline forwardly.

In parallel with the roof switch 55, there are also provided relays 111 and 112 which have cotacts 111a and 112a, respectively, connected with the power source 130. The relays 111 and 112 respectively have movable contacts 111b and 112b which are connected through lines 113 with the roof actuating motor 23. The contact 55b of the roof switch 55 is connected with a first seat back position switch 114 which is closed when the seat back is in the forwardly inclined position. The first seat back position switch 114 is connected to the ground through a rear quarter window position switch 115 and a relay solenoid coil 111c of the relay 111. The switch 114 is normally open but closed when the rear quarter window 102 is in the fully open position. It will therefore be understood that when the roof switch 55 is actuated to move the roof structure to the retracted position, the roof actuating motor 23 is supplied with current in the direction shown by a solid arrow to initiate the movement of the roof structure only when the rear seat back 31 is in the forwardly inclined position and the rear quarter window 102 is opened. The motor 23 is deenergized when the seat back 31 is returned to the upright position and the seat back position switch 114 is opened.

The contact 55c of the roof switch 55 is connected with a second seat back position switch 116 which is of a normally open type and closed when the seat back 31 is in the forwardly inclined position. The second seat back position switch 116 is connected to the ground through a rear quarter window position switch 117 and a relay solenoid coil 112c of the relay 112. The switch 117 is of a normally open type and closed when the rear quarter window 102 is fully opened. It will therefore be understood that when the roof actuating switch 55 is actuated to move the roof structure to the erected position, the motor 23 is supplied with current in the direction shown by a broken arrow to drive the roof structure to the erected position only when the seat back 31 is in the forwardly inclined position and the rear quarter window 102 is in the retracted position.

For driving the rear quarter window 102, there are provided relays 119 and 120 which have stationary contacts 119a and 120a, respectively, connected with the power source 130. The relays 119 and 120 respectively have movable contacts 119b and 120b which are connected through lines 118 with the window driving motor 82. There is also provided a window actuating switch 103 having a movable contact 103a connected with the power source 130. The switch 103 has a window opening contact 103b and a window closing contact 103c. The contact 103c is connected with the contact 107b of the first roof position detecting switch 107 as well as the contact 110c of the second roof position detecting switch 110. The contact 103c is also connected to the ground through a window position switch 122 and a relay solenoid coil 120c of the relay 120. The switch 122 is of a normally closed type and opened when the rear quarter window 102 is in the closed position.

The contact 103b of the switch 103 is connected with the contact 107c of the first roof position switch 107 as well as the contact 110b of the switch 110. Further, the contact 103b is connected to the ground through a window position switch 121 and a relay solenoid coil 119c of the relay 119. The switch 121 is of a normally closed type and opened when the rear quarter window 102 is fully opened. It will therefore be understood that when the roof actuating switch 55 is operated to open the roof structure or when the window switch 103 is actuated to open the window 102, the relay 119 is energized so that the motor 82 is supplied with current in the direction shown by a solid arrow to thereby move the rear quarter window 102 to the open position. Thus, with the control circuit described above, whenever the roof structure is actuated, the rear seat back 31 is moved to the forwardly inclined position and the rear quarter window 102 is moved to the open position before the movement of the roof structure is started. After the roof structure is moved to the desired position, the seat back 31 is returned to the upright position and the rear quarter window is closed as desired.

The invention has thus been shown and described with reference to specific embodiments, however, it should be noted that the invention is in no way limited to the details of the illustrated structures but changes and modifications may be made without departing from the scope of the appended claims.

We claim:

1. A convertible vehicle body structure including body means which includes front windshield means having an upper edge portion, a rear body section having an upper edge defining a belt line and front and rear seat means respectively each having seat back means, said seat back means of said rear seat means being movable between an upright position and a forwardly inclined position, locking means for locking said seat back means of the rear seat means in the upright position, to said rear body section, retractable roof panel means movable between an erected position wherein it covers a top portion of a passenger compartment and a retracted position wherein it is retracted in the rear body section first means for actuating the roof panel means between the erected and retracted positions, second means for inclining the seat back means of the rear seat means forwardly, said second means including lock releasing means for releasing the locking means, sequential control means for operating the second means and the first means sequentially to incline the seat back means of the rear seat means forwardly and actuate the roof panel means, said locking means including a locking plate provided on the rear body section and having a locking edge and a locking lever swingably mounted on the seat back means of the rear seat means, said locking lever having a locking pawl adapted to be engaged with said locking edge of the locking plate, resilient means for biasing the locking lever to a position wherein the locking pawl is engaged with the locking edge of the locking plate, said releasing means being means for acting on the locking lever to swingably move the locking lever so that the locking pawl is disengaged form the locking edge.

2. A convertible vehicle body structure in accordance with claim 1 in which said releasing means is a solenoid means.

3. A convertible vehicle body structure in accordance with claim 1 in which said rear seat means includes seat cushion means on which a seat back position switch is provided, said seat back position switch being adapted to be actuated when the seat back means of the rear seat means is forwardly inclined to a predetermined position, said control means including means for inhibiting actuations of the roof means until the seat back position switch is actuated.

4. A convertible vehicle body structure in accordance with claim 1 in which said roof panel means includes a front roof panel section and a rear roof panel section which are separately formed.

* * * * *